(12) United States Patent
Baker et al.

(10) Patent No.: US 6,338,067 B1
(45) Date of Patent: Jan. 8, 2002

(54) PRODUCT/SERVICE HIERARCHY DATABASE FOR MARKET COMPETITION AND INVESTMENT ANALYSIS

(75) Inventors: David N. Baker; Steven M. Shum, both of San Francisco, CA (US)

(73) Assignee: Sector Data, LLC., San Francisco, CA (US)

( * ) Notice: Subject to any disclaimer, the term of this patent is extended or adjusted under 35 U.S.C. 154(b) by 0 days.

(21) Appl. No.: 09/260,389

(22) Filed: Mar. 2, 1999

Related U.S. Application Data

(60) Provisional application No. 60/098,777, filed on Sep. 1, 1998.

(51) Int. Cl.⁷ .............................................. G06F 17/30
(52) U.S. Cl. ...................... 707/100; 707/10; 707/104.1; 707/513; 705/20; 705/26; 705/30; 705/402; 705/404; 709/201; 709/217; 709/252; 379/115.01; 345/762
(58) Field of Search .................... 717/8; 704/9; 706/55; 707/1–5, 100–104, 200–205, 3, 4, 10, 104.1, 513; 705/26–29, 34–37, 40, 20, 23, 402, 30, 404, 408, 410; 709/201, 219, 213, 217, 224, 250, 252

(56) References Cited

U.S. PATENT DOCUMENTS

| | | | |
|---|---|---|---|
| 4,692,896 A | | 9/1987 | Sakoda et al. .................. 717/8 |
| 5,315,634 A | * | 5/1994 | Tanaka et al. ................. 379/57 |
| 5,339,392 A | * | 8/1994 | Risberg et al. ............. 345/762 |
| 5,369,577 A | | 11/1994 | Kadashevich et al. .......... 704/9 |
| 5,379,366 A | | 1/1995 | Noyes .......................... 706/55 |
| 5,418,942 A | | 5/1995 | Krawchuk et al. .............. 707/3 |
| 5,467,472 A | | 11/1995 | Williams et al. ................ 707/1 |
| 5,502,637 A | | 3/1996 | Beaulieu et al. ............. 364/408 |
| 5,504,892 A | | 4/1996 | Atsatt et al. ................. 707/103 |
| 5,557,785 A | | 9/1996 | Lacquit et al. ............... 707/104 |
| 5,564,119 A | | 10/1996 | Krawchuk et al. ............. 707/4 |

(List continued on next page.)

FOREIGN PATENT DOCUMENTS

| | | | |
|---|---|---|---|
| EP | 0 588 445 A2 | 3/1994 | ......... G06F/15/413 |
| EP | 0 715 254 A2 | 6/1996 | ............. G06F/9/44 |
| WO | WO 96/18963 | 6/1996 | ......... G06F/157/00 |

OTHER PUBLICATIONS

Hu, Y. F. et al., "Asia, The Dominant Future Market for Mobil–Satellite Communications", 1996 International Conference on Communication Technology Proceedings, ICCT'96., May 5–7, 1996, vol. 1, pp. 301–304.*

Shvartsman, Alex A., "Dealing with History and Time in a Distributed Enterprise MAnager", IEEE Network, Nov. 1993, vol. 7, Issue: 6, pp. 32–42.*

*Primary Examiner*—Hosain T. Alam
*Assistant Examiner*—Shahid Alam
(74) *Attorney, Agent, or Firm*—Michael A. Glenn

(57) ABSTRACT

A product hierarchy database organizes company market performance and stock investment information by the products and services produced and offered by each competitor. The companies that produce each product/service are relationally linked to each of their products/services through records. An investment information service includes the product/service hierarchy database and makes it accessible to investor and analyst subscribers through a query system across the Internet. Data entry personnel continually load qualitative and quantitative information about companies and their products/services through a product hierarchy generator connected to the product/service hierarchy database. Subscribers can punch-through to query individual data items, and they can find out what relationships exist between all the important aspects of the companies and the products/services being tracked. The invention also provides for the creation of an index and corresponding index value for every product or service type in the database, which consists of a composite of all companies in a product or service area and whose index value can be measured and compared against any other product or service type index value.

20 Claims, 6 Drawing Sheets

U.S. PATENT DOCUMENTS

| | | |
|---|---|---|
| 5,568,639 A | 10/1996 | Wilcox et al. ............... 707/200 |
| 5,594,899 A | 1/1997 | Knudsen et al. ................ 707/2 |
| 5,608,904 A | 3/1997 | Chaudhuri et al. ............ 707/2 |
| 5,615,112 A | 3/1997 | Liu Sheng et al. ......... 707/104 |
| 5,627,979 A | 5/1997 | Chang et al. ................ 345/335 |
| 5,664,189 A | 9/1997 | Wilcox et al. ............... 707/205 |
| 5,689,716 A | 11/1997 | Chen .......................... 707/500 |
| 5,774,880 A | 6/1998 | Ginsberg ..................... 705/36 |
| 5,802,518 A | 9/1998 | Karaev et al. ................. 707/9 |
| 5,806,049 A | 9/1998 | Petruzzi ....................... 705/36 |
| 5,918,241 A * | 10/1998 | Reiter ........................ 705/408 |
| 5,893,079 A * | 4/1999 | Cwenar ....................... 705/36 |
| 5,930,806 A * | 7/1999 | Taira et al. .................. 707/204 |
| 6,029,176 A * | 2/2000 | Cannon ....................... 707/104 |
| 6,035,285 A * | 5/2000 | Schlect et al. ................ 705/30 |
| 6,154,738 A * | 11/2000 | Call .............................. 707/4 |
| 6,178,411 B1 * | 1/2001 | Reiter ........................ 705/408 |
| 6,195,697 B1 * | 2/2001 | Bowman-Amuah ......... 709/224 |

* cited by examiner

| Introduction to Indices | Indices by Sector | Index Gainers | Index Decliners | Most Active Indices | Calculation Method |

Index Decliners

| Industry, Sector, Subsector | Symbol | Last | Daily Chg. | 52Week High | 52Week Low | Today %Chg. | Rank | Last 1 Month %Chg. | Rank | Last 3 Months %Chg. | Rank | Year to Date %Chg. | Rank |
|---|---|---|---|---|---|---|---|---|---|---|---|---|---|
| INDUSTRIES | | | | | | | | | | | | | |
| S Technology | TECHN | 189.58 ↓ | −6.05 | 221.05 | 110.80 | −3.09% | 2 | −9.56% | 2 | +1.83% | 1 | +5.59% | 1 |
| S Healthcare | HCARE | 96.81 ↓ | −1.26 | 118.90 | 84.49 | −1.28% | 1 | −3.41% | 1 | −0.76% | 2 | −11.69% | 2 |
| SECTORS | | | | | | | | | | | | | |
| ■ Internet/Online | WWWEB | 369.44 ↓ | −26.83 | 584.36 | 164.29 | −6.77% | 17 | −24.34% | 17 | −25.23% | 17 | +5.10% | 9 |
| ■ Software | SFTWR | 184.42 ↓ | −5.78 | 220.57 | 121.98 | −3.04% | 16 | −13.04% | 16 | +2.42% | 10 | −8.44% | 14 |
| ■ Communications Equipment | COMMM | 164.41 ↓ | −5.06 | 187.68 | 93.52 | −2.99% | 15 | −5.17% | 10 | +11.83% | 5 | +16.34% | 7 |
| ■ Consumer Electronics | CENTX | 105.01 ↓ | −2.82 | 114.45 | 76.18 | −2.61% | 14 | −5.09% | 9 | +3.62% | 8 | +5.39% | 8 |
| ■ Communications Services | COMSV | 195.27 ↓ | −4.98 | 221.77 | 104.25 | −2.49% | 13 | −7.68% | 15 | −2.05% | 13 | +24.26% | 5 |
| ■ Semiconductor Capital Equipment | SEMCP | 247.58 ↓ | −5.69 | 275.63 | 106.56 | −2.25% | 12 | −1.67% | 4 | +22.54% | 3 | +31.33% | 4 |
| ■ Medical Supplies | MDSUP | 166.96 ↓ | −3.49 | 205.53 | 166.60 | −2.05% | 11 | −6.76% | 12 | −3.28% | 14 | −14.02% | 15 |
| ■ Medical Devices | MDDVI | 117.42 ↓ | −2.34 | 130.62 | 91.00 | −1.95% | 10 | −4.00% | 7 | +2.25% | 11 | −1.60% | 11 |
| ■ Data Storage | DATAX | 162.45 ↓ | −3.22 | 187.76 | 100.97 | −1.97% | 9 | −7.19% | 13 | +7.66% | 7 | −4.62% | 12 |
| ■ Computer Hardware | HRDWR | 136.29 ↓ | −2.62 | 151.35 | 98.64 | −1.89% | 8 | −5.08% | 8 | −0.35% | 12 | +0.20% | 10 |
| ■ Semiconductors | SEMIC | 334.23 ↓ | −6.38 | 366.14 | 129.98 | −1.87% | 7 | −2.06% | 5 | +27.49% | 2 | +48.99% | 1 |
| ■ Technology Services | TKSRV | 197.58 ↓ | −3.46 | 286.86 | 185.85 | −1.72% | 6 | −6.11% | 11 | −4.84% | 15 | −24.06% | 16 |
| ■ Outsourced Technology Mfg. | OTMFG | 271.06 ↓ | −4.05 | 299.49 | 129.04 | −1.47% | 5 | −2.14% | 6 | +36.75% | 1 | +34.41% | 2 |
| ■ Scientific Products | SCIPR | 263.45 ↓ | −3.82 | 276.10 | 171.19 | −1.43% | 4 | −0.48% | 3 | +11.16% | 6 | +17.79% | 6 |
| ■ Electronic Components | ELCMP | 271.22 ↓ | −3.50 | 286.86 | 145.18 | −1.27% | 3 | +0.08% | 1 | +15.57% | 4 | +32.96% | 3 |
| ■ Healthcare Services | HSRVC | 85.22 ↓ | −1.03 | 130.92 | 86.25 | −1.19% | 2 | −7.53% | 14 | −9.79% | 16 | −25.29% | 17 |
| ■ Biopharmaceuticals | BPHRM | 96.35 ↓ | −0.83 | 112.66 | 79.33 | −0.86% | 1 | −0.24% | 2 | +2.84% | 9 | −8.06% | 13 |
| SUBSECTORS | | | | | | | | | | | | | |
| ◆ Information | NFRMN | 869.94 ↓ | −66.68 | 1535.66 | 423.25 | −7.12% | 129 | −28.61% | 128 | −28.87% | 127 | +4.36% | 63 |
| ◆ Consumer-to-Consumer (C2C) | CNSUM | 14072.41 ↓ | −1030.39 | 25870.90 | 3310.24 | −6.82% | 128 | −33.87% | 129 | −32.40% | 129 | +29.42% | 23 |
| ◆ Business-to-Consumer (B2C) | BZCON | 512.89 ↓ | −36.26 | 888.52 | 238.26 | −6.61% | 127 | −27.72% | 127 | −31.73% | 128 | −10.98% | 111 |
| ◆ Services | SRVCN | 433.74 ↓ | −29.97 | 656.71 | 174.11 | −6.46% | 126 | −23.41% | 126 | −21.30% | 126 | | |
| ◆ Business E-Commerce (B2B) | BTOBC | 614.99 ↓ | −41.70 | 930.14 | 225.39 | −6.35% | 125 | −21.90% | 125 | −20.33% | 125 | | |

FIG. 7

PRODUCT/SERVICE HIERARCHY DATABASE FOR MARKET COMPETITION AND INVESTMENT ANALYSIS

This application claims benefit of provisional Ser. No. 60/098,777 filed Sep. 1, 1998.

BACKGROUND OF THE INVENTION

1. Technical Field

The invention relates to databases used for investment and market analysis. More particularly, the invention relates to investment and market analysis databases with product/service hierarchy structures.

2. Description of the Prior Art

Qualitative research and common sense can help an investor spot publicly traded companies that are under-valued or over-valued. An under-valued company is generally a good company in which to invest, and conversely an overvalued company is one that should be divested. It has been the present inventors' experience that qualitative information often precedes any quantitative changes that significantly impact a publicly traded company's operating results. Thus, the ability to organize the qualitative information that is publicly available can provide investors with early signals to act before the rest of the investment community does.

In the prior art, qualitative research has been a time-intensive, inexact, and all too manual a process. Consequently, many investors do not focus on qualitative issues because there has been no practical tool for analyzing the large volume of available qualitative data. Nor has there been an easy way to organize such data into useful investment information. Such investors therefore act on the quantitative changes that impact a company's operating results, e.g. earnings per share. Early information about a company's quantitative changes is often classified as insider information, and is illegal to use in most situations.

It is important to provide investors with a way to filter the key qualitative criteria that is essential for accurate comparative valuation and peer-group analysis. What is lacking in the commercial marketplace is a tool for classifying each competitor's product or service, strategic partners, major customers, their end-user markets served, any regulatory agencies that affect the business, their particular business strategy, and other such significant data.

It would be advantageous to provide a product-hierarchy database that organizes accurate comparable industry, sector, sub-sector, and group market performance and stock investment information centered around the products produced and services performed of each company and their true competitors, with each product or service type created as an index. Such product hierarchy should enable the creation of an index for each product or service type which can be valued and measured.

SUMMARY OF THE INVENTION

The invention provides a product-hierarchy database that organizes accurate comparable industry, sector, sub-sector, and group market performance and stock investment information centered around the products produced and services performed of each company and their true competitors, with each product or service type created as an index. Such product hierarchy enables the creation of an index for each product or service type which can be valued and measured.

A product hierarchy database is provided that organizes and tracks company market performance and stock investment information by the products and services produced and offered by each competitor. The product hierarchy is created in the database independently of the companies. The companies that produce each product are then relationally linked to each product in the hierarchy that corresponds to a product produced or service performed by each company. An investment information service includes the product hierarchy database and makes it accessible to investor and analyst subscribers through a query system across the Internet. Data entry personnel continually load qualitative and quantitative information about companies and their products through a product hierarchy generator connected to the product hierarchy database. Subscribers can punch-through to query individual data items, and they can find out what relationships exist between all the important aspects of the companies and the products being tracked. The invention also provides performance criteria by industry, sector, sub-sector, and group, thereby allowing industry, sector, sub-sector, and group-based qualitative assessment.

BRIEF DESCRIPTION OF THE DRAWINGS

FIG. 7 is a report showing relative industry, sector, sub-sector, and group trends according to the invention.

DETAILED DESCRIPTION OF THE INVENTION

The invention provides a product-hierarchy database that organizes accurate comparable industry, sector, sub-sector, and group market performance and stock investment information centered around the products produced and services performed of each company and their true competitors, with each product or service type created as an index. Such product hierarchy enables the creation of an index for each product or service type which can be valued and measured.

Figure 1:
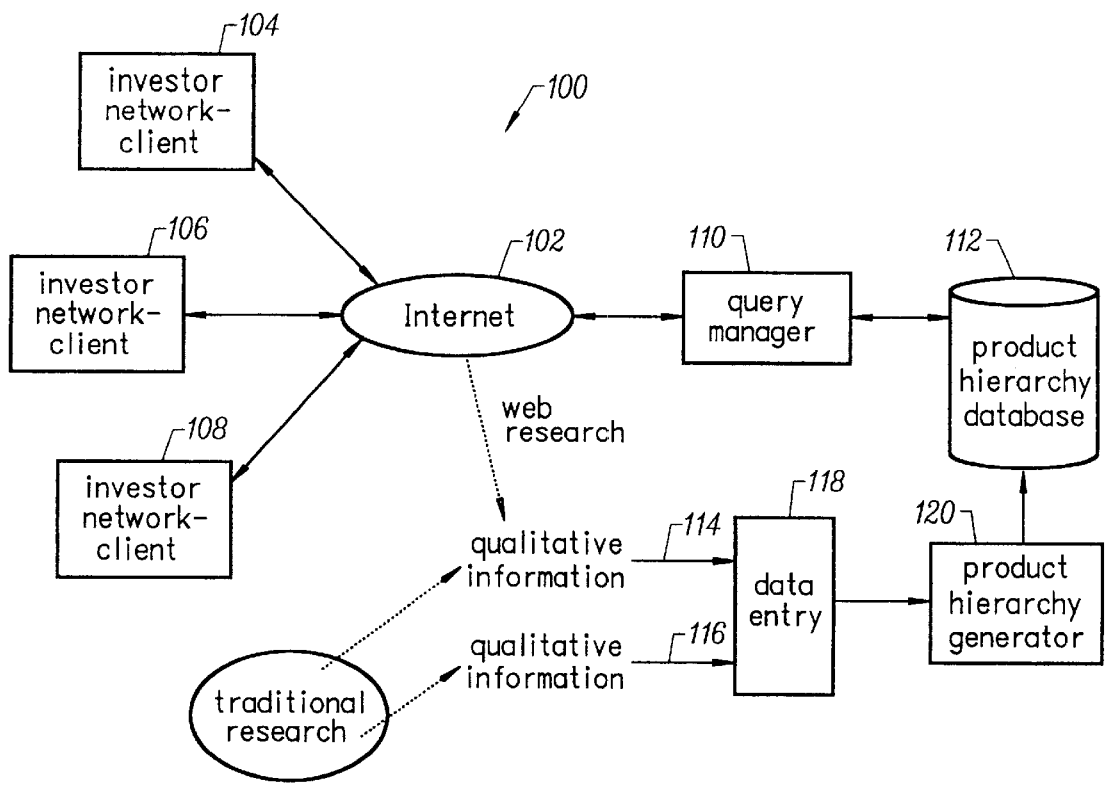
FIG. 1 is a block diagram illustrating a public company analysis system embodiment of the invention.

FIG. 1 illustrates a public company analysis system embodiment of the invention, and is referred to herein by the general reference numeral 100. The system 100 operates over the Internet 102 and can support the securities investment informational needs of a plurality of investors, represented in FIG. 1 as investor network clients 104, 106, and 108. A query manager 110 appears as a Web page and interfaces the network clients 104, 106, and 108 with a product hierarchy database 112. Qualitative and quantitative information 114 and 116 about public traded companies and their products are input through a data entry system 118 to a product hierarchy generator 120. The qualitative and quantitative information 114 and 116 can come from Web-based research or traditional research based on documents and publications. The product hierarchy generator 120 builds a relational database in the database 112 that is structured by product.

Such database 112 is useful in the analysis of competing companies and their markets through the use of database relationships that are based on product hierarchies. Users are able to conduct comprehensive comparative valuation analysis by industry, sector, sub-sector, and group product. Users can also obtain hierarchical industry, sector, sub-sector, and group profiles. A combination of qualitative and quantitative data queries can be supported. Database 112 preferably allows investors to conduct queries by searching on individual or multiple qualitative and quantitative categories. Database 112 preferably allows investors to conduct qualitative analysis of quantitative data and quantitative analysis of qualitative data. Database 112 can be used in securities analysis of publicly traded companies and to increase partnership investment performance.

An investment research database 112 provides qualitative and quantitative data for publicly traded companies in a single source accessible via the Internet. Database 112 supports industry, sector, sub-sector, and group hierarchical classifications based on specific products or services. Queries through the Internet 102 allow users to see how specific companies are positioned by group within a particular industry, sector, sub-sector, as well as relative industry, sector, sub-sector, and group by industry, sector, sub-sector, and group performance.

The proper creation of industries, sectors, sub-sectors, and groups, and the proper classification of companies are essential for accurate comparative valuation and peer group analysis. The product hierarchy generator 120 categorizes all companies into appropriate industries, sectors, sub-sectors, and groups, and product areas according to a hierarchy within their respective industries. In this way, investor users can get accurate peer group analysis, relative valuation comparisons, and qualitative queries within a chosen industry, sector, sub-sector, or group. The hierarchy is built based on products produced or services performed within industries, which is a bottoms-up approach to company classification.

Figure 2:
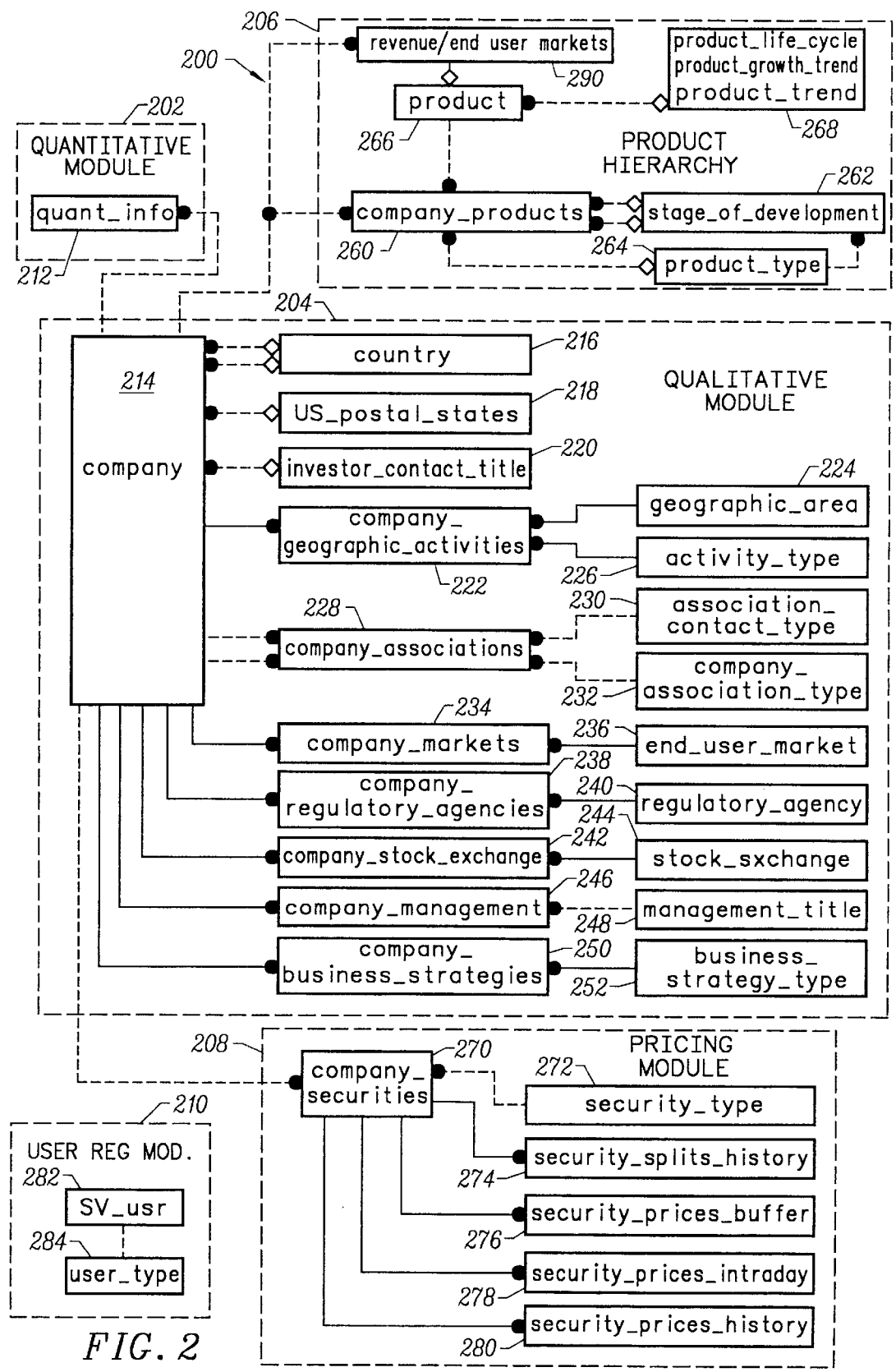
FIG. 2 is a block diagram illustrating a database structure embodiment of the invention.

FIG. 2 illustrates a database structure embodiment of the invention, and is referred to herein by the general reference numeral 200. The database structure 200 is equivalent to the database 112 (FIG. 1) and comprises a quantitative module 202, a qualitative module 204, a product hierarchy 206, a pricing module 208, and a user registration module 210. The quantitative module 202 includes one or more quantitative information records 212 that preferably have substantially all the data entry fields listed in Table I. Specialized applications may achieve good results using subsets of the information fields listed in Table I.

TABLE I (Quantitative Information)

CO_ID(FK)
RECORD_TYPE
RECORD_NO

| | | |
|---|---|---|
| year | quarter | derived_data_processed_flag |
| industr_code | repno | cusip |
| ticker | coname | split_date |
| split_factor | currency_code | currency_rate |
| fplen | fplenscf | fptyp |
| fpbegdt | fpenddt | updstatis |
| updstatbs | updstatcf | restdtis |
| restdtbs | restdtcf | fisperiod |
| revenue | interest_income_bank | premiums_earned |
| net_investment_income | realized_gains_losses | other_revenue |
| total_revenue | cost_of_revenue | losses_benefits_adjustments |
| amortization_of_policy_costs | fuel_expense | direct_operating_expenses |
| selling_general_admin_expenses | depreciation_and_amortization | research_and_development |
| interest_expense | other_operating_expenses | unusual_income_expenses |
| interest_expense_bank | loan_loss_provision | total_expenses |
| interest_income_non_operating | interest_expense_non_operating | interest_net_non_operating |
| afudc | non_interest_income | non_interest_expense |
| gain_loss_on_sale_of_assets | other_net | income_before_taxes |
| income_taxes | income_after_taxes | minority_interest_is |
| equity_interests_is | preferred_dividends | general_partner_distribution |
| us_gap_adjustment | misc_earnings_adjustment | interest_adjust_primary_eps |
| adj_inc_avail_to_cmn_prim_eps | primary_eps_excl_xord_items | discontinues_operations |
| extraordinary_items | accounting_change | primary_ips_include_xord_items |
| dividends_per_common_share | primary_average_shares_outstnd | full_dilution_adjustment |
| fully_diluted_shares_outstnd | fd_eps_excl_xord_items | fd_eps_include_xord_items |
| cash_and_equivalents | cash_and_due_bank | other_short_term_investments |
| investments | loans | loan_loss_reserves |
| other_interest_earning_assets | accounts_receivable | inventory |
| prepayments_and_advances | deferred_policy_acqsn_costs | other_current_assets |
| total_current_assets | long_term_investments | utility_plant |
| utility_plant_depreciation | utility_plant_net | property_plant_equipment |
| accum_depreciation_and_amort | property_plant_equipment_net | goodwill_intangibles |
| deferred_charges | other_assets | other_long_term_assets |
| total_assets | accounts_payable | short_term_debt |
| deposits | other_interest_bearing_liab | policy_liabilities |
| curr_port_ltd_cap_lease_oblig | other_current_liabilities | other_liabilities |

TABLE I-continued (Quantitative Information)

CO_ID(FK)
RECORD_TYPE
RECORD_NO

| | | |
|---|---|---|
| total_current_liabilities | long_term_debt | capitalized_lease_obligations |
| tota_long_term_debt | minority_interest_bs | deferred_taxes |
| other_long_term_liabilities | total liabilities | redeemable_preferred |
| preferred_stock | common_stock | additional_paid_in_capital |
| retained_earnings | treasury_stock | other_equity |
| esop_debt_guarantee | total_shareholder_equity | shares_outstanding_period_end |
| net_income_scf | depreciation_scf | amortization_scf |
| deferred_taxes_indirect | other_non_cash_items | cash_receipts |
| cash_payments | cash_taxes_paid | cash_interest_paid |
| other_operating_cash_flows | total_cash_from_operating_act | capital_expenditures |
| other_investing_cash_flows | total_cash_from_investing_act | dividends_paid |
| purchase_or_sale_of_stock | purchase_and_retirement_debt | other_financing_cash_flows |
| total_cash_from_financing_act | exchange_rate_effects | net_change_in_cash |
| cash-interest_paid_indirect | cash_taxes_paid_indirect | depreciation_amortization_scf |
| dividend_growth_5yr | revenue_growth_5yr | earnings_per_share_growth_5yr |
| revenue_per_employee | no_of_employees | avg_square_feet_space |
| sv_gross_profit | sv_gross_margin | sv_selling_gen_admin_percent |
| sv_research_anddev_prcnt | sv_total_expenses | sv_oprtng_income |
| sv_oprtin_margin | sv_income_before_tax_margin | sv_tax_rate |
| sv_net_income_mrgn | sv_long_term_debt_to_capital | sv_long_term_debt_to_equity |
| sv_total_dept_to_equity | sv_workin_capital | sv_curr_ratio |
| sv_quick_ratio | sv_oprtng_cash_flow_last_yr | sv_roe_trailing_4_quarters |
| sv_roe_last_5_fiscal_years | sv_roe_last_quarter | sv_roa_trailing_4_quarters |
| sv_roa_last_5_fiscal_years | sv_roa_last_quarter | sv_total_capital |
| sv_total_debt | sv_roic_trailing_4_quarters | sv_roic_last_5_fiscal_years |
| sv_roic_last_quarter | sv_cash_per_share | sv_dso_last_quarter |
| sv_dso_last_5_fiscal_years | sv_inventory_turnover_1st_qtr | sv_inventory_turnover_1st-yr |
| sv_oprtng_income_to_assets_tr | sv_book_value_per_share | sv_oprtng_cash_flow_trailing |
| sv_oprtng_cash_flow_share_tr | sv_oprtng_cash_flow_share_lfy | sv_pct_chng_gross_mrgn_seq |
| sv_pct_chng_gross_mrgn_yoy | sv_pct_chng_oprtng_mrgn_seq | sv_pct_chng_oprtng_mrgn_yoy |
| sv_pct_chng_income_mrgn_seq | sv_pct_chng_income_mrgn_yoy | sv_sales_per_share_trailing |
| sv_sales_per_share_lst_5_yr | sv_asset_turnover_trailing | sv_asset_turnover |
| sv_interest_coverage_lst_qtr | sv_interest_coverage_lst_5_yr | sv_revenue_growth_seq |
| sv_revenue_growth_yoy | sv_revenue_growth_1_year | sv_earn_per_share_growth_yoy |
| sv_earn_per_share_growth_seq | sv_earn_per_share_growth_1_yr | sv_1_yr_forward_eps_growth_rt |
| sv_market_capitalization | sv_current_price_to_earnings | sv_historical_pe_ratio |
| sv_forward_pe_ratio | sv_price_to_book_value | sv_price_to_sales_trailing |
| sv_price_to_sales_5fyr | sv_price_to_oprtng_cash_flow | sv_price_to_free_cash_flow |
| sv_current_pe_ratio_to_growth | sv_forward_pe_ratio_to_growth | sv_free_cf_per_share_tr |
| sv_free_cf_per_share_lfy | sv_price_to_free_cf_tr | sv_avg_gross_ppe_per_employee |
| sv_avg_gross_ppe_per_sqft | sv_debt_to_mkt_cap | sv_pct_chng_gross_mrgn_fy |
| sv_pct_chng_oprtng_mrgn_fy | sv_pct_chng_income_mrgn_fy | |

The data entry system 118 (FIG. 1) is used to load quantitative information 116 (FIG. 1) about particular companies in each field listed in Table I. The abbreviations and acronyms listed here are merely examples, and it will be obvious to most readers what these fields each represent. Typically, the balance sheet, income, and cash flow statement line items from the company's quarterly announcements are included in the data. From this, it is possible to use spreadsheet programs to compute various key operating ratios important to the investment community. Other information structures can also be used in alternative embodiments of the invention.

The qualitative module 204 includes one or more company records 214. Each such company record 214 preferably includes the data fields listed in Table II. There is a relational database linkage between the quantitative information records 212 and the company records 214.

TABLE II (Company Record)

ID

| | | |
|---|---|---|
| name | | |
| type_code | address_line_1 | address_line_2 |
| address_city | address_state (fk) | address_zip |
| address_country(fk) | phone_number | phone_fax_number |
| investor_contact_first_name | investor_contact_last_name | ictitle_ID(fk) |
| auditors_opinion | management_background | legal_proceedings_flag |
| legal_proceedings_notes | number_of_employees | web_site_address |

TABLE II-continued

(Company Record)

ID

| | | |
|---|---|---|
| email_address | minority_stub | minority_stub_percent |
| analysts_number | description | web_update_user_id |
| web_update_password | us_business_by_country (fk) | us_business_percentage |
| other_business_in_us | other_business_percentage | notes |
| scffmtcode | business_strategy_text | last_quant_q_rec |
| last_quant_y_rec | | |

Each company record 214 is associated within the qualitative module 204 with a country record 216, a us_postal_states record 218, an investor_contact_title record 220, a company_geographic_activities record 222 that includes a geographic_area record 224 and an activity_type record 226, a company_associations record 228 that includes an association_contact_type record 230 and a company_association_type record 232, a company_markets record 234 with an end_user_market record 236, a company_regulatories_agency record 238 with a regulatory_agency record 240, a company_stock_exchanges record 242 with a stock_exchange record 244, a company_management record 246 with a management_title record 248, a company_business_strategies record 250, and a business_strategy_type record 252. All records 216–252 have relational database linkages to the company record 214.

The country record 216 preferably includes a name field and a note field. The us_postal_states record 218 preferably includes a postal code field and a name field. The investor_contact_title record 220 preferably includes an identity (ID) field, a name field and a notes field. The company_geographic_activities record 222 preferably includes company identity (co_ID), activity_ID, geographical are (geoarea_ID), percent of business (percent), and notes fields. The geographic_area record 224 preferably includes identity (ID), name, and notes fields. The activity_type record 226 preferably includes identity (ID), name, and notes fields. The company_associations record 228 preferably includes identity (ID), contact name, investment percentage, company ID for and to, coassnty_ID, and conty_ID fields. The association_contact type record 230 preferably includes identity (ID), name, and notes fields. The company_association_type record 232 preferably includes name, and notes fields. The company_markets record 234 preferably includes company identity (co_ID), name, and object_ID fields. The end_user_market record 236 preferably includes identity (ID), name, and notes fields. The company_regulatories_agency record 238 preferably includes company identity (co_ID) and object ID fields. The regulatory_agency record 240 preferably includes identity (ID), name, and notes fields. The company_stock_exchanges record 242 preferably includes company identity (co_ID) and object ID fields. The stock_exchange record 244 preferably includes identity (ID), name, and notes fields. The company_management record 246 preferably includes company identity (co_ID), order number, title ID, manager name, manager compensation, and notes fields. The management_title record 248 preferably includes identity (ID), name, and notes fields. The company_business_strategies record 250 preferably includes company identity (co_ID) and object ID fields. The business_strategy_type record 252 preferably includes identity (ID), name, and notes fields.

The product hierarchy 206 has several records in a strict hierarchy that is built according to several critical rules. Such rules are described in detail below in connection with FIGS. 3–6. A company_products record 260 preferably includes fields for company ID, object ID, tradename, product-type ID, regulatory-agency stage ID, clinical stage ID, side effects, indications, identity (ID), and notes for every product or service that a particular company offers. A stage_of_development record 262 preferably includes identity (ID), product-type ID, name, and notes fields for every product or service that is recorded in the company_products record 260. A product_type record 264 includes identity (ID), name, and notes field for every product or service that is recorded in the company_products record 260. A product record 266 includes independent fields for its own identity (ID), its parent's identity in the product hierarchy, the product name, the total available market, the trend identity (trend_ID), and notes. Product_life_cycle, product_growth_trend, and product_trend records 268 include identity (ID), name, and notes fields.

A revenue/end user market function 290 contains a revenue table that includes a percentage figure, and contains an end user market table that includes a list of available end user markets. The revenue table and end user market table are linked to the company record 214 and the product hierarchy 266. It is important to note that the revenue/end user market function may be linked to any level of the product hierarchy. This allows user selection of a most appropriate level in the product hierarchy to identify revenues and end user markets.

The product record 266 is unique in that it allows the construction of a hierarchy through the use of its parent identity field.

The pricing module 208 also comprises several records. A company_securities record 270 preferably includes identity (ID), company identity (co_ID), security type ID, CUSIP number, and ticker symbol fields. A security_type record 272 preferably includes identity (ID), name, and notes fields. A security_splits_history record 274 preferably includes company security identity (COSEC_ID), split date, and split factor fields. A security_prices_buffer record 276 preferably includes company security identity (COSEC_ID), stock symbol type, cusip number, ticker, last price, time of last price, 52-week high, 52-week low, earnings estimates, and price_changed_flag fields. A security_prices_intraday record 278 preferably includes identity (ID), name, and notes fields. A security_prices_history record 280 preferably includes price date, company security identity (COSEC_ID), last price, time of last price, 52-week high, 52-week low, earnings estimates, and price-changed-flag fields.

The user registration module 210 includes a subscriber (SV_user) record 282 and a user_type record 284. The SV_user record 282 preferably includes user type ID, nickname, password, user name, phone, and e-mail fields. The user_type record 284 preferably includes fields for name and notes. The user registration module 210 is used to enroll and validate investor network-clients 104, 106, and 108 (FIG. 1) when they log-on to the query manager 110 over the internet 102.

In operation, a query can be constructed by query manager 110 (FIG. 1) to find all relations to a particular field content in a particular record. For example, the company_regulatories_agencies record 238 can be used to list all companies in the database 200 that share the same regulatory agencies.

The product hierarchy 206 (FIG. 2) includes a company_products record 260 with links to a stage_of_development record 262 and a product type record 264. Each company_products record 260 is linked to one or more records 266 for each product, and each product life cycle, product_growth_trend, and product_trend record 268 is linked to one or more records 266 for each product.

The product hierarchy 206 includes all the products of all the companies in the database 200 in as many product records 266 as are necessary. The product hierarchy 206 can span all industry, sector, sub-sector, and groups and is based solely on the products or services that are produced by each competing company.

Fundamentally, each new product hierarchy chain is created in the database 200 according only to a product manufactured or a service performed, and must be completely independent of any other factor. A hierarchical breakdown within any industry, sector, sub-sector, or group is independent of the constituent companies themselves. Only their individual products and services matter. Accordingly, all such companies are associated at a particular product level based upon products manufactured or services performed and not dependent on a company's self-described business description.

Each such hierarchy begins at its top with broad product types, and scales down and branches out to very specific products. Any relationships that exist between product levels is preferably handled in a record, e.g. by assigning a parent identity and level number to each product. An unlimited number of product levels can be created in an industry, sector, sub-sector, or group within a product hierarchy.

When a new product level in a hierarchy is created, it is attached as a subset of a previous level or category and is related by association. Every other lower and subsequent product level is associated, linked, or related to some other higher level in the chain of the product hierarchy 206, except at the highest level.

Two separate products, represented in two product records 266 on the same level, may be attached or related to a single parent or higher level in the product hierarchy 206. Constructed this way, the two products can be related to one another. However, two products at the same level with the same parent are never directly linked or made dependent on the other. A product level can have an unlimited number of sub-product levels attached below it.

Figure 3:
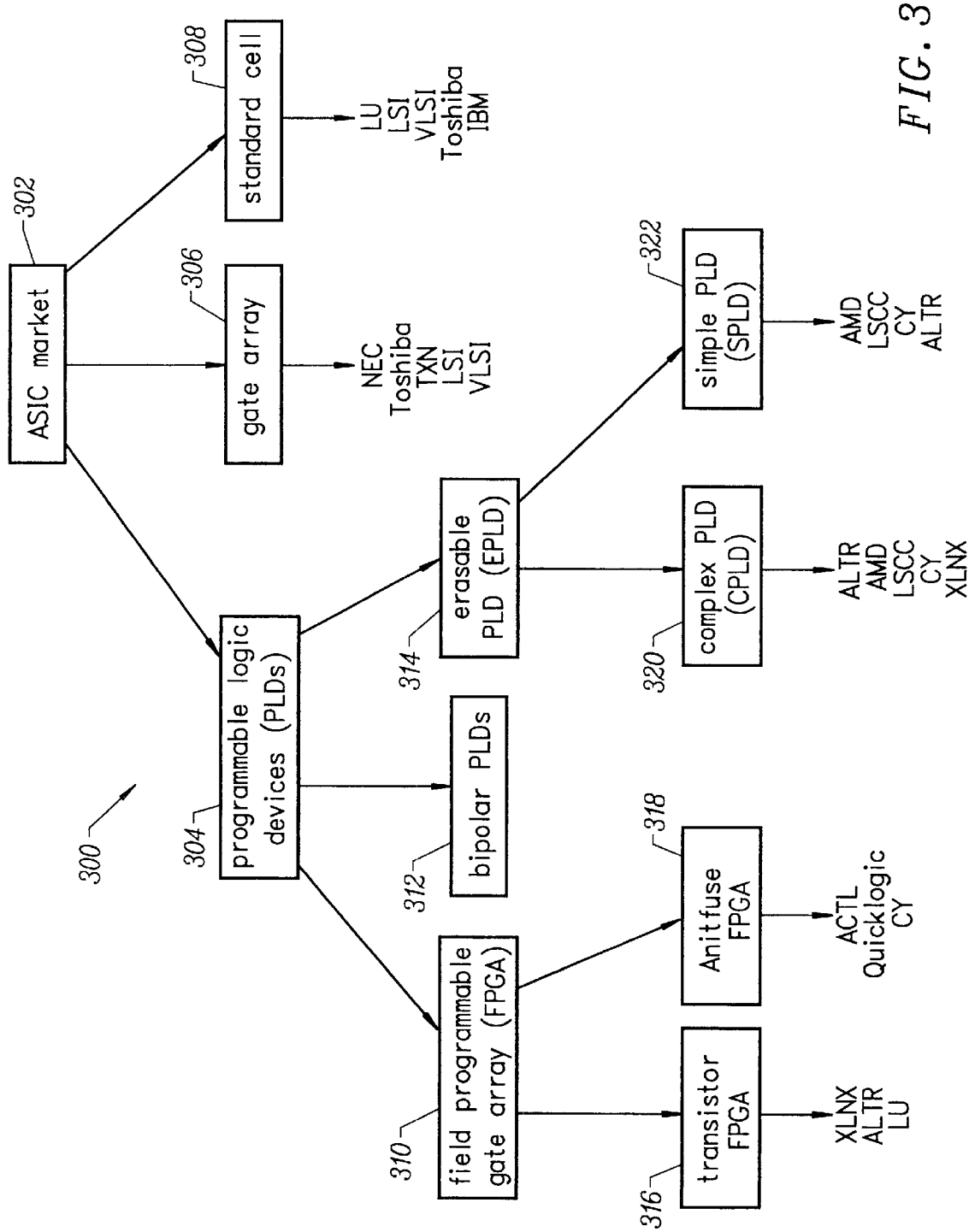
FIG. 3 is a block diagram of a product hierarchy methodology of the invention at its top level providing, as an example, the whole of the application specific integrated circuit (ASIC) market.

Consider FIG. 3. A product hierarchy 300 represents at its top level 302 the whole of the application specific integrated circuit (ASIC) market. The components of the ASIC market include, at lower levels, the programmable logic devices (PLD's) level 304, a gate array level 306, and a standard cell level 308. Individual gate array products attached to gate array level 306 are produced by well-known companies: NEC, Toshiba, Texas Instruments, LSI Logic, and VLSI Systems. Individual standard cell products attached to standard cell level 308 are produced by LU, Toshiba, LSI Logic, and IBM. Lower levels are needed in the PLD industry, sector, sub-sector, and group, so a field programmable gate array (FPGA) level 310, a bipolar PLD level 312, and an eraseable PLD level 314 are needed in the product hierarchy 300. The FPGA industry, sector, sub-sector, and group is further divided into a transistor FPGA level 316 and an antifuse FPGA level 318. These two product areas include products from Xilinx, Altera, and LU, and also Actel, Quicklogic, and Cypress Logic, respectively. The eraseable PLD level 314 is split into complex PLD level 320 and a simple PLD level 322.

Figure 4:
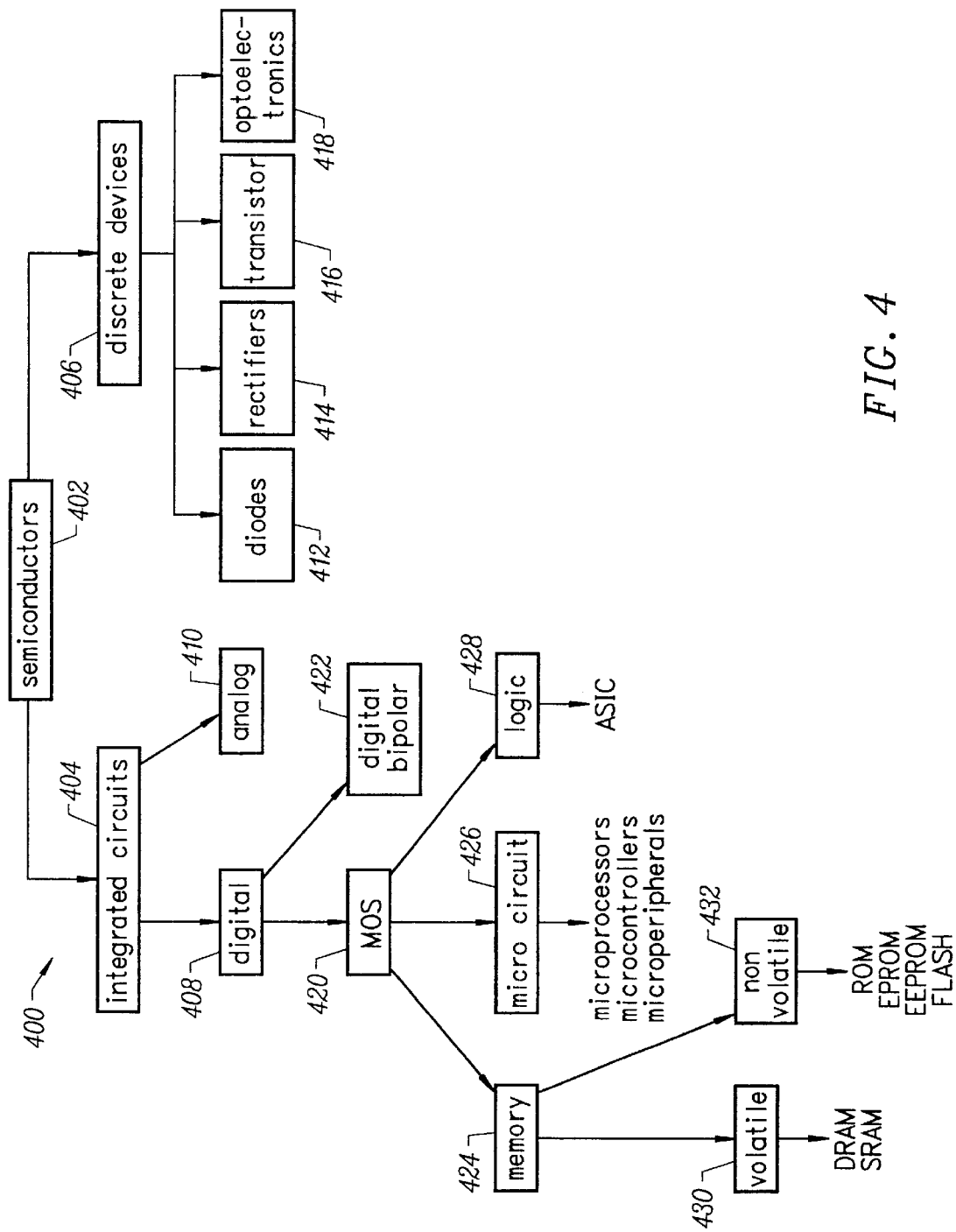
FIG. 4 is a block diagram that illustrates another product hierarchy according to the invention, showing how the product hierarchy can be used to drill down to increase specificity of the product area or drill up for a broader look at the product market.

FIG. 4 illustrates a product hierarchy 400 in a further example. A semiconductor level 402 includes an integrated circuits (IC) level 404 and a discrete devices level 406. The IC level 404 is divided into a digital IC level 408 and an analog IC level 410. The discrete devices level 406 has as its constituents, a diodes level 412, a rectifiers level 414, a transistors level 416, and an opto-electronics level 418. The digital level 408 is split between a metal-oxide semiconductor (MOS) level 420 and a digital bipolar level 422. The MOS level 420 has beneath it a memory level 424, a microcircuit level 426, and a logic level 428. The top of the ASIC level 302 (FIG. 3) could be attached to the logic level 428 (FIG. 4) in this example. The memory level 424 is further divided into a volatile memory level 430 and a non-volatile memory level 432.

There is an important difference between the product hierarchy 206 and individual companies. The product hierarchy is created independent of companies. Products that make up the product hierarchy are called product levels. Individual company products are referred to as company products and are specific to the company itself. There are several data items that are also tied to the individual company specific products and include brandname or tradename, revenue percentage, and end-user markets.

Figure 5:
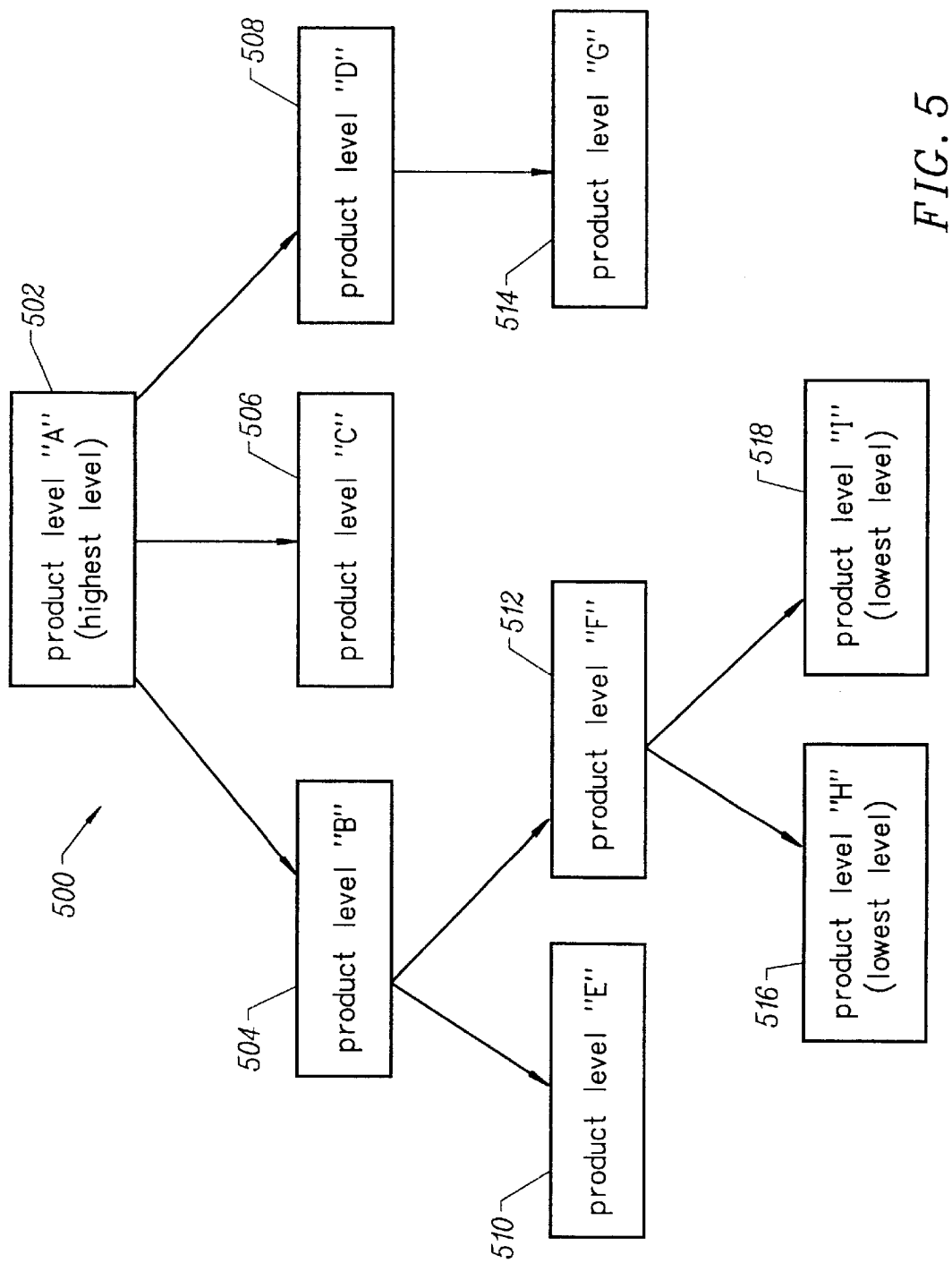
FIG. 5 is a block diagram that illustrates still another product hierarchy, beginning with broad product types at top level and scaling down and branching out to very specific products.

FIG. 5 represents a generalized product hierarchy 500. The product hierarchy begins with broad product types at top level "A" 502, and scales down through levels 504–518 and branches out to very specific products. Companies can only be directly linked to the lowest level in the hierarchy, but are then identified with higher levels because the parent levels in the hierarchy are directly linked to the lower levels. The relationships that exist between product levels is preferably memorialized in one lookup record using a method of assigning a parent identity and level number to each product. An unlimited number of product levels 502–518 can be created in an industry, sector, sub-sector, and group within the product hierarchy 500. When a new product level in the product hierarchy 500 is created, it then becomes a subset of the previous level/category and is related by association. With the exception of the highest level, every other lower and subsequent product level is associated/linked/related to some other higher level in the chain of the product hierarchy.

Referring to FIG. 5, a company cannot be attached to product level "D" 508 5 because a lower product level "G" 514 exists. A company may be attached to product level "G" 514 because it is a bottom level. Companies and other company product specific qualitative aspects can be attached to product level "I" 518, for example. Thus, product level "H" 516 could have attached to it, product 1 of company 1 or product 1 of company 2 with tradename/brandname 1.

A company, and thus the brandname or tradenames of its products, can only be attached, or associated at the lowest, node level of the product hierarchy. Any company may have multiple products with multiple brandname or tradenames assigned to the same level in the product hierarchy 206 of a particular industry, sector, sub-sector, or group. In addition, a company and its product's brandname or tradename may be attached at an unlimited number of lowest product levels in the product hierarchy, and across different industries, sectors, sub-sectors, and groups. An unlimited number of companies and thus products, brandnames or tradenames can be attached, associated to one lowest level in the product hierarchy 206. A company with multiple products can exist at multiple product levels, and in multiple product hierarchies in multiple and different industries, sectors, sub-sectors, and groups.

Once a product level has been created, there cannot be a link between it and a company at a higher level. A company and its product brandname or tradename can only be linked at the lowest node of the product hierarchy 206. In other words, a particular product record 266 that is named as a parent to another product record 266 cannot be attached to a company_products record 260. Companies can be associated to higher levels by default due to the associations that are 3 created by the product hierarchy 206 itself through the parent relationships that the hierarchy uses.

Figure 6:
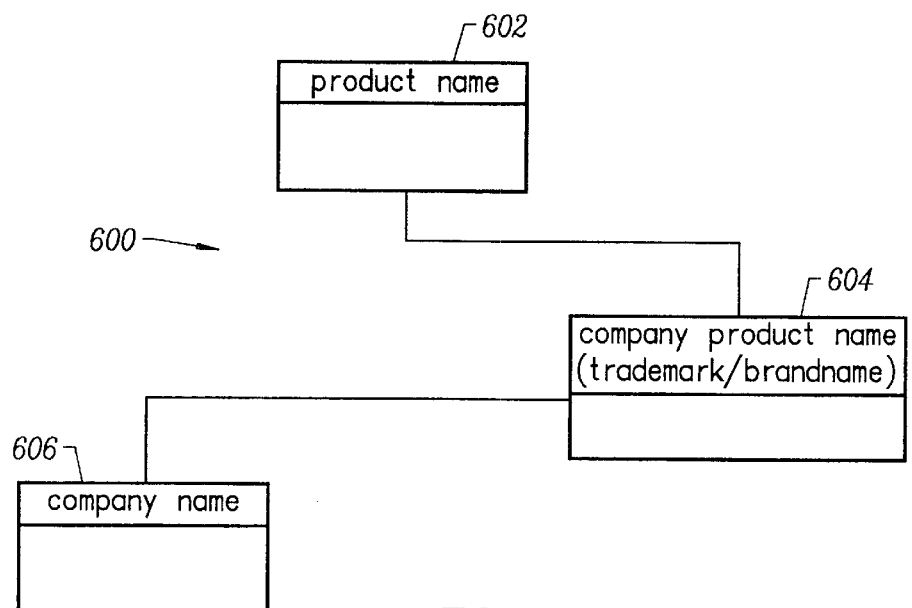
FIG. 6 is a block diagram of a database structure that allows the building of a product hierarchy where companies can be related or associated to an appropriate product level through the trademark/brandname of its products.

In FIG. 6, a database structure 600 uses a product name record 602, a company-product name or trademark/brandname record 604, and a company name record 606. Each record can then be freely associated with each other record and its individual records.

Referring once again to FIG. 2, when a node level in the product hierarchy 206 is created, there are two methods for inputting data that are mutually exclusive. In a first method, a company which has a product and a corresponding brandname or tradename can be attached to a lowest product level. This action thereafter defines that product level as the lowest level in the chain. In a second method, another product level is attached by creating a new level in the product hierarchy 206. Once a company and its product has been assigned to a hierarchy level, it becomes associated at every higher level in the product hierarchy for that particular chain of connection by default. As a result, companies can be associated with the highest to the lowest hierarchy levels.

Database 200 hierarchically categorizes companies in company records 214 into appropriate industries, sub-industries, sectors, sub-sectors, and groups based solely upon their respective product or services. The product hierarchy 206 therefore is the only mechanism that defines how a company is to be categorized within an industry, sector, sub-sector, or group. This is a critical way in which the invention is distinguished over the prior art.

The result of this product hierarchy 206 and companies being attached at the lowest level is that proper industries, sectors, sub-sectors, and groups are created. The highest level in the product hierarchy would define the broadest industries, sectors, sub-sectors, and groups, with the greatest number of companies making up that industry, sector, sub-sector, or group. As one scales down the product hierarchy, industries, sectors, sub-sectors, and groups are narrowed, becoming more refined and specific, eventually getting down to the lowest levels with fewer companies. These industries, sectors, sub-sectors, and groups can then be looked at to track performance, relative to other industries, sectors, sub-sectors, and groups or individually on any quantitative and certain qualitative parameters. By definition, industries, sectors, sub-sectors, and groups are created at every product level in the product hierarchy. The central point is that any of these industries, sectors, sub-sectors, and groups can be evaluated on any quantitative and certain qualitative parameters.

Therefore, system 100 (FIG. 1) provides the ability to display systematically, search, and compare all companies and peer groups, based upon products manufactured or services performed anywhere within an industry, sector, sub-sector, and group, as well as perform industry, sector, sub-sector, and group by industry, sector, sub-sector, and group comparisons.

Another critical aspect of the invention is that all of the qualitative data 114 (FIG. 1) that is related to a company is selectively parsed and placed into separate fields for each item, e.g. Tables I–II. Such fields are given specific database linkages that allow the data to be associated or linked to other data. This provides the database 200 with enough flexibility to perform data mining and to drill down for specific information. Searches can be performed on any data element in database 200.

Information about an individual company's products or services, by brandname or tradename, is loaded in a separate record. It will be appreciated that the terms "products" and "services" are used interchangeably herein. Each company's products record 266 is linked or related to its general company information record 214. Each company that produces a product in a product hierarchy 206 is associated to that product's level in the product hierarchy through a company products record 260. If a company does not have a tradename or brandname for its product, and the data entry field is therefore left blank at the data entry stage 118 (FIG. 1), an identifier (ID) is nevertheless automatically assigned so such company can still be linked or associated to a product level in a corresponding hierarchy. Redundant product tradenames may be attached at many, bottom node levels in the product hierarchy. A company can have one of its products attached at multiple, lowest product levels in the product hierarchy. A company may have an unlimited number of products.

Product records can be specialized for particular industries, sectors, sub-sectors, and groups. For example, the company product record for medical device and biopharmaceutical companies preferably includes information fields for each product's clinical and regulatory stage, side effects, and prescription indications.

An individual company can be related to some other company or entity for any number of reasons. A two-way database association is implemented by linking two separate records to the general company record 214 through a many-to-many relationship. The two record links are the association and is represented by the double lines between company record 214 and company associations record 228 in FIG. 2. The company association type record 232 identifies why the two entities are related, and/or otherwise explains the basis for the association. Association types can include customers, strategic partners, corporate and venture shareholders, equipment suppliers, and component suppliers. An unlimited number of association types can be created. Such structure allows a user to search by a particular association type. For example, list all of the customers for company A or list all the companies that have company A as a customer. In another example, if company A has company B as a customer, then from company B's perspective company A could be either a component or equipment supplier.

The geographic dispersion of revenues and manufacturing can be recorded for each individual company. Preferably, the database structure for this is processed in three separate records 222, 224, and 226. These are related to each other and are related as a group to the general company record 214. The same geographic areas can be related to any number of otherwise independent companies. This allows searches to be done based on the type of activity, sales or manufacturing, as well as the geographic area, to produce any and all companies that meet the criteria.

Revenue percentage figures can be attached to every one of a company's products. A data field is included to store the percentage of revenue a company generates for each product. Such revenue percentage value can be attached at any level in a product hierarchy, lowest to highest for a particular company for its products. Therefore, if a figure has been entered at a higher level in the product hierarchy, it may represent the percentage of revenue generated for more than one company product. If such company has multiple products associated at lower levels in the product hierarchy, the sum of the figures entered for a company may not exceed one hundred percent. A search by query manager 110 is satisfied if a figure is entered at a lower level in the product hierarchy and the user nevertheless sets a parameter based on a higher level in the chain.

End-user market records 236 are attached to each company market record 234 and company record 214 for each one of the company's products. An association is made to both the company's products as well as the product hierarchy 206. Such information can be attached at any level in the product hierarchy for a company. Multiple end-user markets can be associated to one product level for a company. A list of the end-user markets is loaded in what is called a reference, or code record where consistency can be maintained much more effectively and eliminate duplicate entries that may be spelled slightly differently. When assigning an end-user market, one must be selected from the available list in the code record. The code record can be unlimited in the number of end-user markets entered. The same end-user market can be attached or associated to many products Regulatory agencies that affect a company are identified. Such information is loaded in a separate record which is then related to the company regulated. One regulatory agency can be associated to an unlimited number of companies. Each company can have an unlimited number of agencies related to it. This allows for searching by a particular agency resulting in any and all companies that are affected by that agency.

Information regarding each company's management team and directors is loaded in a single record structure, which is then related to the company record.

Each company in database 200 has certain generic business strategies associated to it. These strategies are loaded in a separate record. One company can have multiple strategies associated to it. Each strategy can have an unlimited number of companies related. This allows searches on a particular strategy to result in all the companies that have been identified as having that strategy.

Product market trend can be associated to any and every product in the product hierarchy, product level dependent but company independent (see FIG. 7). The trends are loaded in a reference record. When associating a trend to a product, one must be selected from the reference record. One product can contain multiple trends. One trend can be attached to multiple products. A total-available-market figure can be attached or associated to each product throughout the product hierarchy. When a new product level name is created in the product hierarchy a separate field exists to enter the total-available-market figure for that product Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A system, comprising:

a database management module providing for the storage and organization of information related to particular commercial companies and products/services;

a plurality of product/service records in said database management module each having a product/service description field and a parent product/service identification field that links all such product/service records together in a product/service hierarchy;

a plurality of company product/service records in said database management module, each having a company product/service description field for linking each said particular commercial company to its corresponding product/service hierarchy records; and a plurality of company records in said database management module having a company description field for linking each said commercial company to its corresponding product/service records;

wherein said database management module loads information about an individual company's products/services by brandname or tradename in a separate record, each company's product/service record is linked or related to its general company information record, and each company that produces a product or provides a service in a product/service hierarchy is associated to that product's/service's level in the product/service hierarchy through a company product/service record; and if a company does not have a tradename or brandname for its product/service, a data entry field is therefore left blank at a data entry stage and an identifier (ID) is nevertheless automatically assigned so such company can still be linked or associated to a product/service level in a corresponding product/service hierarchy.

2. The system of claim 1, further comprising:

a query module for displaying systematically, searching, and comparing all said commercial companies and any peer groups, based upon products manufactured or services performed anywhere within an industry, sector, sub-sector, or group as defined by said hierarchy.

3. The system of claim 1, further comprising:

means for creation of an index and corresponding index value for every product or service type in said database which consists of a composite of all companies in that product or service area and whose index value can be measured and compared against any other product or service type index value.

4. The system of claim 1, wherein:

said information related to particular commercial companies and products/services is selectively parsed and placed upon input to said database management module into separate data fields for each item.

5. The system of claim 1, wherein:

any redundant product/service records may be attached at many, bottom node levels in the product/service hierarchy, and a company can have one of its products/services attached at multiple, lowest product/service levels in the product/service hierarchy, and each said commercial company may have an unrestricted number of product/service records.

6. The system of claim 5, wherein:

said product/service records and hierarchy formation are specialized for particular industries, sectors, subsectors, or groups with data entry fields generic to a particular commercial industry.

7. The system of claim 1, wherein:

said database management module relates an individual company to some other company or entity for any number of reasons, and a two-way database association is implemented by linking two separate records to the general company record through a many-to-many relationship.

8. The system of claim 1, wherein:

said database management module records any geographic dispersion of revenues and manufacturing for each individual company.

9. The system of claim 1, wherein:

said database management module attaches any revenue-percentage figures to every one of said commercial company's products/services, and a data field is included to store such percentage of revenue a company generates for each product/service at any hierarchy level.

10. The system of claim 1, wherein:

said database management module attaches an end-user market record to a company market record and a company record for each one of said commercial company's' products/services at any hierarchy level.

11. The system of claim 1, wherein:

said database management module makes end user markets and/or revenues an association to both said commercial company's' products/services as well as to said product hierarchy, and such information can be attached at any level in said product/service hierarchy for a company.

12. The system of claim 1, wherein:

said database management associates multiple end-user markets to one product level for a company, and a list of any end-user markets is loaded in to a reference or code record where consistency can be maintained and duplicate entries that may be spelled slightly differently can be eliminated.

13. The system of claim 1, wherein:

said database management module identifies any regulatory agencies that affect a company in a regulatory-agency record, such that any one regulatory agency can be associated to an unlimited number of said commercial companies, and each said commercial company can have an unlimited number of agencies related to it.

14. The system of claim 1, wherein:

said database management module loads any information regarding each said commercial company's management team and directors in a single-record structure, which is then related to said company record.

15. The system of claim 1, wherein:

said database management module associates each said commercial company with certain generic business strategies and such strategies are loaded in a separate record.

16. The system of claim 1, wherein:

said database management module associates a product/service market trend to any and every said product/service record in said product/service hierarchy, and said product/service market trend is loaded in a reference record, and such that when associating a trend to a product/service, said product/service must be selected from said reference record.

17. A database system, comprising:

a quantitative information module into which facts about a plurality of particular companies are loaded and can be accessed;

a qualitative module with a company database record having a relational database linkage and access to the quantitative information module, and further comprising database records for individual ones of said particular companies that includes location, market, stock exchange, company management, and company business strategy information records each with independent relational database linkages to said company database record; and a product/service hierarchy with a company products/services database record having a relational database linkage and access to said company database record, and further comprising a product/service record with a field that describes a parent product/service record;

wherein said product/service hierarchy loading information about an individual company's products/services, by brandname or tradename in a separate record, each company's product/service record is linked or related to a general company information record, and each company that produces a product or provides a service in a product/service hierarchy is associated to that product's/service's level in the product/service hierarchy through a company product/service record; and if a company does not have a tradename or brandname for its product/service, a data entry field is therefore left blank at a data entry stage and an identifier (ID) is nevertheless automatically assigned so such company can still be linked or associated to a product/service level in a corresponding hierarchy.

18. The database system of claim 17, wherein:

said product/service hierarchy further comprises a stage-of-development record with a relational-database linkage to said company product/service record.

19. The database system of claim 17, further comprising:

a pricing module having a company securities record with a relational database linkage and access to said company database record, and further comprising database records for individual ones of said particular companies that includes security types, splits, and prices records with a relational database linkage to said company securities record.

20. The database system of claim 17, further comprising:

a subscriber registration module providing for an enrollment and a verification of investor network-clients over an Internet connection that thereafter engage in a query of the qualitative module.

* * * * *